United States Patent
Jadhav et al.

(10) Patent No.: US 10,951,625 B2
(45) Date of Patent: Mar. 16, 2021

(54) CROSS-APPLICATION IDENTITY AND ACCESS MANAGEMENT

(71) Applicant: Accenture Global Solutions Limited, Dublin (IE)

(72) Inventors: Praveen Jadhav, Plano, TX (US); Abdul Zafar, Plano, TX (US); Jagaran Das, Durgapur (IN)

(73) Assignee: Accenture Global Solutions Limited, Dublin (IE)

( * ) Notice: Subject to any disclaimer, the term of this patent is extended or adjusted under 35 U.S.C. 154(b) by 180 days.

(21) Appl. No.: 16/178,150

(22) Filed: Nov. 1, 2018

(65) Prior Publication Data

US 2020/0007555 A1  Jan. 2, 2020

(30) Foreign Application Priority Data

Jun. 29, 2018  (IN) .............................. 201811024248

(51) Int. Cl.
*H04L 29/06* (2006.01)
*G06F 16/23* (2019.01)

(52) U.S. Cl.
CPC ........ *H04L 63/105* (2013.01); *G06F 16/2379* (2019.01); *H04L 63/102* (2013.01)

(58) Field of Classification Search
CPC ..... H04L 63/105; H04L 63/102; H04L 67/10; H04L 67/1097; H04L 67/306; G06F 16/2379; G06F 21/6218; H04W 8/18
(Continued)

(56) References Cited

U.S. PATENT DOCUMENTS 6,122,741 A * 9/2000 Patterson ............ G06F 21/6218
707/999.009
8,533,773 B2  9/2013 Maes
(Continued)

FOREIGN PATENT DOCUMENTS

CN  100530181  8/2009
CN  104067268  9/2014
(Continued)

OTHER PUBLICATIONS

EP Extended Search Report in European Application No. 19183040. 5, dated Oct. 14, 2019, 7 pages.
(Continued)

*Primary Examiner* — Maung T Lwin
*Assistant Examiner* — Sanchit K Sarker
(74) *Attorney, Agent, or Firm* — Fish & Richardson P.C.

(57) ABSTRACT

Techniques are described for unified identity and access management (IAM) across multiple applications in a distributed (e.g., cloud) computing environment. Implementations provide for IAM across multiple applications through use of a single, unified IAM tool including an IAM interface. The IAM tool can manage user identity and user access rights for multiple applications in the platform environment. The IAM tool can also employ a unified IAM database, which stores user profiles that each describes user access rights for a user in one or more applications. Through use of the unified IAM tool, an operator can access a single interface to manage user identity and access privileges across multiple applications which may have their own identity management interfaces, with user roles in different applications mapped through use of an equivalency matrix in some cases. The IAM tool can be used to add, remove, or edit user access privileges for multiple applications.

20 Claims, 6 Drawing Sheets

(58) Field of Classification Search
USPC .......................................................... 726/4
See application file for complete search history.

(56) References Cited

U.S. PATENT DOCUMENTS

| | | | |
|---|---|---|---|
| 8,732,101 B1 | 4/2014 | Wilson et al. | |
| 8,768,965 B2* | 7/2014 | Kimball | G06F 16/957 |
| | | | 707/784 |
| 10,148,786 B1 | 12/2018 | Beaty | |
| 2007/0150480 A1 | 6/2007 | Hwang et al. | |
| 2014/0143149 A1* | 5/2014 | Aissi | G06F 21/629 |
| | | | 705/44 |
| 2015/0358331 A1* | 12/2015 | Rachalwar | H04L 63/102 |
| | | | 726/7 |
| 2016/0105420 A1* | 4/2016 | Engan | H04L 9/3228 |
| | | | 455/411 |
| 2016/0295543 A1* | 10/2016 | Adams | H04W 8/183 |
| 2016/0335118 A1* | 11/2016 | Beiter | G06F 9/468 |
| 2017/0091658 A1* | 3/2017 | Matthiesen | G06N 20/00 |
| 2017/0093777 A1* | 3/2017 | Neustifter | H04L 51/16 |
| 2017/0094487 A1* | 3/2017 | Phan | G06F 16/24575 |
| 2017/0147790 A1* | 5/2017 | Patel | H04L 63/105 |
| 2020/0007555 A1* | 1/2020 | Jadhav | H04L 67/10 |
| 2020/0007620 A1* | 1/2020 | Das | H04L 41/22 |

FOREIGN PATENT DOCUMENTS

| | | |
|---|---|---|
| JP | 2007143172 | 6/2007 |
| WO | WO 2015/108536 | 7/2015 |

OTHER PUBLICATIONS

Savidis et al., "Unified user interface development: the software engineering of universally accessible interactions" Univ Access Inf Soc, May 4, 2004, 3:165-193.

* cited by examiner

CROSS-APPLICATION IDENTITY AND ACCESS MANAGEMENT

CROSS-REFERENCE TO RELATED APPLICATION

This application claims priority from Indian Application No. 201811024248, filed Jun. 29, 2018. The contents of the prior application is incorporated herein by reference in its entirety.

BACKGROUND

In a cloud computing environment or other type of distributed computing environment, multiple applications may be hosted and made available to users such as subscribers to the environment. Users can access executing instance(s) of application(s) in the environment, and thus avoid the resource expenditure and/or monetary expense that would be consumed if the user purchased and executed the application(s) in their own computing environment. In a traditional environment in which multiple applications (e.g., from various application providers) are hosted, identity management can pose a challenge given that the number of identity management tasks to be performed can increase rapidly in proportion to the number of applications hosted in the environment.

SUMMARY

Implementations of the present disclosure are generally directed to managing user identity and access privileges across multiple applications. More particularly, implementations of the present disclosure are directed to a unified identity and access management system that provides for identity and access management across multiple applications that are executed in a platform environment, such as a cloud computing environment, using a single unified interface and/or a unified database to store user identity and access rights information.

In general, implementations of innovative aspects of the subject matter described in this specification can be embodied in a method that includes the following operations: receiving at least one update to a user profile of a user, the at least one update provided through an identity and access management (IAM) interface executing on a computing device, wherein the IAM interface is a single interface that is useable to configure user profiles to control user access to a plurality of applications that execute in a platform; applying the at least one update to the user profile that is stored in a unified IAM database, wherein the user profile indicates a respective access level of the user to each of at least two applications of the plurality of applications; and based on the user profile, communicating the respective access level of the user to a respective management module for each of the at least two applications, wherein the respective access level of the user controls access of the user to the respective application.

These and other implementations can each optionally include one or more of the following innovative aspects: the operations further include accessing a matrix that specifies at least one mapping between corresponding access levels on different applications, wherein the applying of the at least one update to the user profile is based at least partly on the at least one mapping specified by the matrix; the at least one update includes a designation of an overall role for the user; the matrix specifies a mapping between the overall role and a corresponding access level on the at least two applications; the applying of the at least one update to the user profile includes designating the corresponding access level for the user on the at least two applications; the user profile indicates that the user is a member of at least two user groups, each of the user groups corresponding to an application and an access level for the application; the at least one update to the user profile includes one or more of adding the user to create the user profile as a new user profile, adding a user group to the user profile, and removing a user group from the user profile; the operations further include displaying, through the IAM interface, for each of the user groups, a number of users who are members of the respective user group; the operations further include accessing metadata that describes a format for communicating with the respective management module, wherein communicating the respective access level of the user to the respective management module is through a call to an interface of the respective management module that is made using the format described in the metadata; the operations further include displaying, through the IAM interface, the user profile of the user including the respective access level of the user to each of the at least two applications; and/or the access level includes one or more of a viewing access level and an administrative access level.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
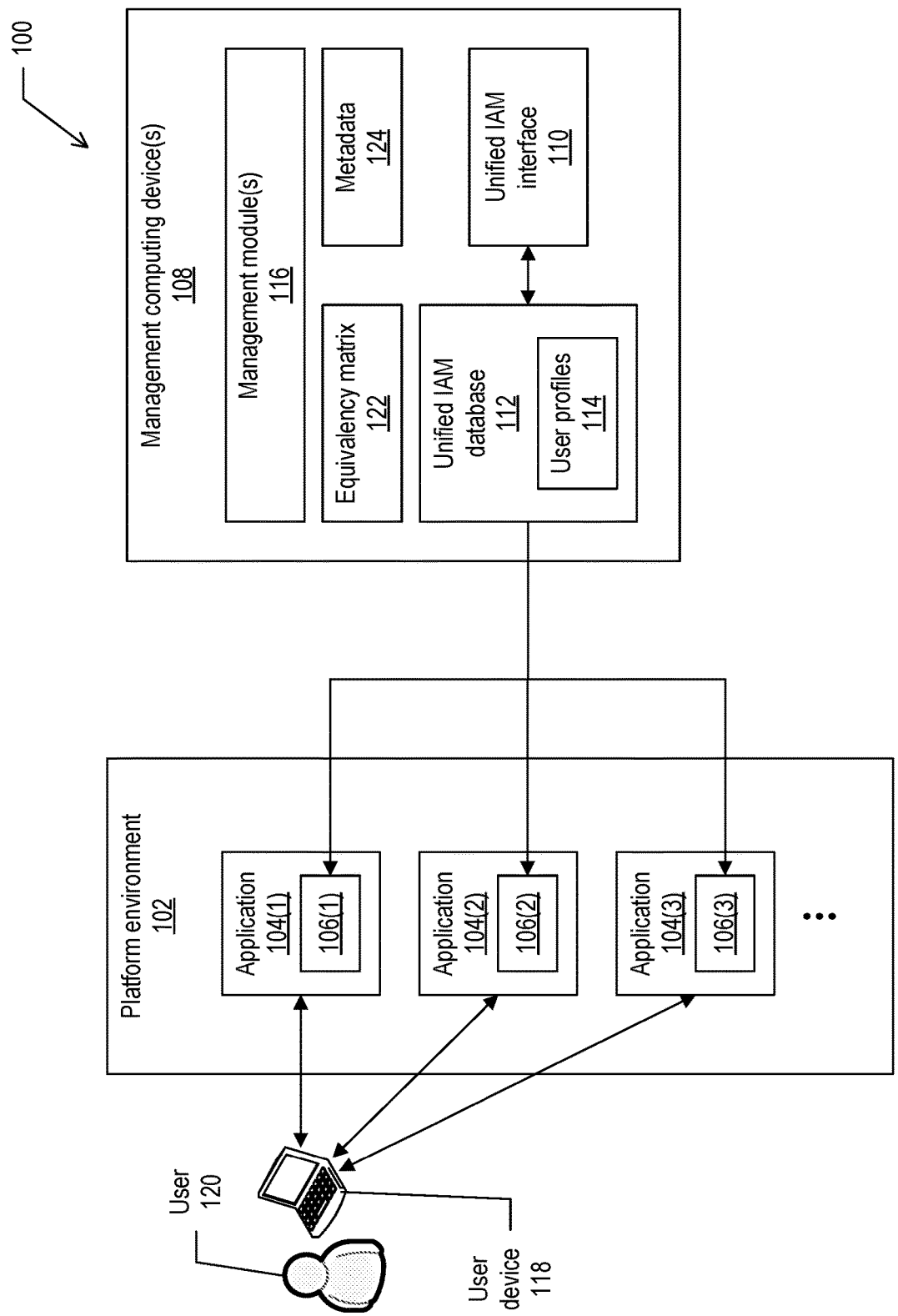
FIGS. 1A and 1B depict example systems, according to implementations of the present disclosure.

Implementations of the present disclosure are directed to techniques for identity and access management (IAM) across multiple applications in a distributed computing environment (e.g., a cloud computing environment), which is also referred to herein as the platform environment or the platform. Implementations provide for IAM across multiple applications through use of a single, unified IAM tool including an IAM interface. The IAM tool can manage user identity and user access rights for multiple applications in the platform environment. The IAM tool can also employ a unified IAM database, such as an instance of Active Directory, which stores user profiles that each describes user access rights for a user in one or more applications.

Implementations provide a centralized IAM tool that can be employed to coordinate identity and access management across different applications hosted in a platform environment. In some examples, the platform environment includes multiple applications that comprise an analytics stack, which enables various types of data analysis and/or data visualization. Through use of the unified IAM tool, an operator (e.g., administrator) can access a single interface to manage user identity and access privileges across multiple applications which may have their own (e.g., native) identity management interfaces. Accordingly, the IAM tool enables the operator to manage IAM for any suitable number of users across any suitable number of applications using a single interface, instead of accessing multiple interfaces for the various applications. The operator can use the IAM tool to add, remove, or edit user access privileges for multiple applications.

In some implementations, the IAM tool can enable the setting of an overall user role for the user, which can then be propagated to a corresponding and/or analogous user role for the user in the various applications in the platform. For example, specifying administrative privileges for the user in the IAM tool can cause the tool to propagate the administrative privileges to the various applications, such that the user is designated as an admin on the various applications. The tool can also allow an operator to specify, for one or more of the applications, different access privileges for the user relative to their overall access privileges. For example, the operator can use the IAM tool to specify that the user is to be an admin overall, except on applications A and B where she is to have a less-privileged (e.g., viewer) role. In this way, implementations provide an IAM tool that creates an equivalency matrix to align and/or map the user roles, identity, and/or access privileges across different applications, thus allowing a user story to be created that is applicable to a set of defined roles or entitlements in each relevant application, while allowing deviations from the user's general access role to be specified for the particular user in particular applications. Through the IAM tool, the operator can assign a certain class of access rights to a user, and the system determines what that class of rights means for each individual application, which could differ across different applications. The IAM tool can perform operations to assign the user the appropriate access rights in each application hosted in the platform, without requiring the operator to individually specify the user access rights in the native identity management interface of each application in the platform.

In some implementations, the IAM tool can employ a layer of metadata that is used to determine how the IAM tool is to interact with the individual applications given a particular request for user profile updates made through the IAM tool. For example, the metadata can specify, for each application, a particular format for (e.g., REST) calls that are made to the native management interface for the application to update user access rights on that application. Updates to a user profile can be made through the IAM interface and stored in the unified IAM database (e.g., Active Directory). The IAM tool can use the metadata to propagate updates to the user profile to the various applications in the platform, through calls to the native management interface of each application.

The IAM tool can also enable identity and access rights management for one or more users across multiple platform environments (e.g., multiple clouds). By creating a unified user profile that specifies a user's general access rights for multiple applications and/or particular access rights for particular applications, implementations also provide a mechanism that facilitates the migration (e.g., copying and or moving) of user profiles from one platform environment to another.

In some examples, the applications hosted by a platform environment can include vendor tools that provide varying types of functionality, such as the tools provided by Tableau™, Informatica™, Talend™, HortonWorks™, and so forth, as well as tools that are provided by the cloud environment itself, such as tools associated with the Google™ Cloud Platform, Microsoft Azure™, Amazon Web Services™, and so forth. The IAM tool can integrate with the functionality of such tools which provides for identity and access rights management for the individual tools. The platform environment can also host other types of applications, such as custom tools and/or subscriber-provided tools. The IAM tool can connect to the various tool management interfaces through use of the unified IAM database (e.g., Active Directory), to provide consolidated user management through a single, unified IAM interface that is part of the IAM tool.

A platform environment such as a cloud computing environment can support a large number of applications that are hosted by and executed within the environment. As more applications are added, such as custom applications, vendor applications, and so forth, it may become more difficult to enforce security policies around identity and access rights management for users of the platform. Traditionally, IAM tasks are handled by an operations department through use of tickets created in issue tracking systems, and the number of tickets for IAM tasks can multiply rapidly as the number of hosted applications and/or number of users increases. By providing a unified IAM interface and IAM tool for IAM tasks, implementations provide a more scalable and efficient solution compared to previously available tools, thus consuming less processing power, storage space, active memory, network bandwidth, and/or other computing resources relative to previously available solutions.

In some implementations, the IAM tool employs a unified IAM database, such as a version of Active Directory, that stores a user profile for one or more users. The user profile can specify the access rights for the user in one or more of the various applications on the platform, including whether or not the user is authorized to access an application and, if so, the access rights (e.g., privileges) of the user in that application. For example, access rights can include whether the user has viewer privileges (e.g., as a normal, non-administrative user) or administrative privileges. The IAM database can provide for the centralized management of users and/or user groups across multiple applications. In some implementations, an organizational unit (OU) can be specified in the database for each application. The OU can include any appropriate number of users groups, which each define a particular set of access rights for the particular application. If a user is a member of a user group, that can indicate that the user has the corresponding access rights to the corresponding application as specified by the user group.

The IAM tool can connect to the IAM database and access the various defined OUs in the database. Based on the access rights defined by the user groups in the OUs, and based on the users who are designated (e.g., in their user profiles) as members of various user group(s), the IAM tool can propagate the access rights for each user to the appropriate applications in the platform. In this way, the IAM tool can provide centralized user identity and access rights management for all the applications in the platform.

In some implementations, a user profile can be a record stored in the unified IAM database. The user profile can include an identification of the user, contact information, other descriptive information regarding the user, and one or more user groups that the user is a member of Membership in a user group indicates that the user has the corresponding access rights to a corresponding application, based on the access rights and application that define the user group. A particular user can have the same (or similar) access rights across multiple applications, or different access rights in multiple applications. For example, the user may be designated as an administrator in one application, and a viewer (e.g., normal user) in another. The designated access rights for a user in multiple applications, as described in the user profile of the user stored in the IAM database, can be propagated to the various applications in the platform. In some implementations, any changes to user access rights that are specified through the access management interfaces of the individual applications can also be propagated back to the user profile in the IAM database. Accordingly, changes to the user profile for a user can be specified through the unified IAM interface of the IAM tool as well as through the individual access rights management interfaces of the individual applications in the platform. Implementations provide the unified IAM tool which may allow an operator to avoid using the individual access rights management interfaces of the individual applications, thus creating a more efficient workflow compared to previously available solutions.

Implementations provide for access control of managed services of any platform from a single service that is the IAM tool. In some examples, a particular platform can support connectors to the platform's software application stack, which enables operators using the IAM tool to control user access rights within the various software applications. Implementations provide for the management of user access in any point (e.g., any application) of the stack, and also enables the isolated management of a user's access rights in a particular application in the stack. Implementations also provide for cross-platform user access rights management, which is independent of any particular platform (e.g., cloud vendor). Thus, implementations enable the seamless migration of user profiles for access rights management between cloud vendors as well as between different partitions of a particular platform.

Figure 1B:
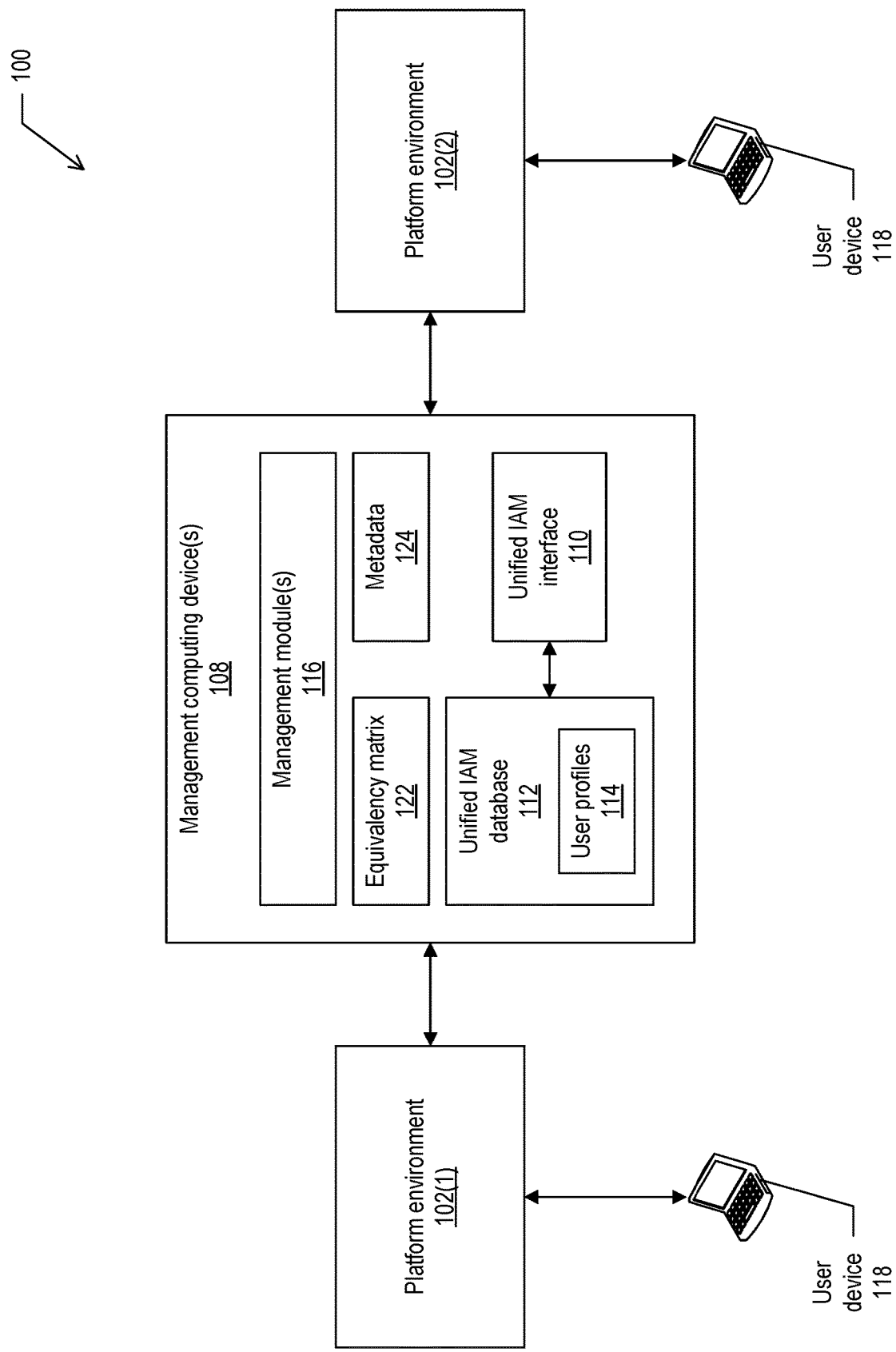

FIGS. 1A and 1B depict example systems 100, according to implementations of the present disclosure. As shown in the example of FIG. 1A, a platform environment 102 can host and execute any suitable number of applications 104. Each of the applications 104 can include its own (e.g., native) access rights management interface 106, which an operator would traditionally access to specify user identity and access rights for that particular application 104. The environment 100 can include one or more management computing devices 108, which can be any suitable number and type of computing device. The device(s) 108 can execute management module(s) 116 that perform operations for unified access rights management and identity management as described herein. The device(s) 108 can also execute a unified IAM interface 110 that is usable to update user access rights for one or more users, manage OUs, manage user groups, and/or perform other operations as described further below. The module(s) 116 and the IAM interface 110 can collectively be described as an IAM tool or a unified IAM tool. The device(s) 108 may host an instance of a unified IAM database 112, such as Active Directory, that stores any appropriate number of users profiles 114. In some implementations, the database 112 may be external to the device(s) 108 and the IAM tool can communicate with the database 112 over one or more networks.

In some implementations, the management module(s) 116 can create and/or maintain an equivalency matrix 122. The matrix 122 can provide a mapping between user roles for different applications, where each user role corresponds to a set of access rights on an application. For example, a role of admin on Application A may be mapped to a role of superuser on Application B, indicating that the roles correspond to the same, or similar, sets of access rights on Application A and Application B. The matrix 122 can also provide a mapping between an overall, general user role and user roles for different individual applications. For example, a general user role of administrator can be mapped, in the matrix 122, to the role of admin in Application A and superuser in Application B. The matrix 122 can be employed by the management module(s) 116 to determine how the specification of a general role for a user 120, made through the interface 110, is translated to the user's role in the individual applications. Following the above example, if an operator specifies, through the interface 110, that a user 120 is to have a general role of administrator, the management module(s) 116 can employ the matrix 122 to determine that the general administrator role corresponds to the admin role in Application A and the superuser role in Application B, and the roles for the user in those applications can be set according to this equivalency by default. In this way, the setting of an overall or general user role for the user can be propagated to a corresponding and/or analogous user role for the user in the various applications in the platform, based on the mappings specified in the matrix 122.

This default setting of roles for individual application, based on the equivalent general or overall user role, can be overridden by the operator through the interface 110. For example, specifying overall administrative privileges for the user in the IAM tool can cause the tool to propagate the administrative privileges to the various applications, such that the user is designated as an admin on the various applications. The tool can also allow an operator to specify, for one or more of the applications, different access privileges for the user relative to their overall access privileges. For example, the operator can use the IAM tool to specify that the user is to be an administrator overall for multiple applications, except on application B where the user is to have a less-privileged (e.g., viewer) role. The IAM tool can perform operations to assign the user the appropriate access rights in each application hosted in the platform, without requiring the operator to individually specify the user access rights in the native identity management interface of each application in the platform.

In some implementations, the IAM tool accesses metadata 124 that describes how the IAM tool is to communicate with the management module 106 (also described as the management interface or native management interface) of each application 104 in the platform 102. The metadata 124 can specify, for each application's management interface, a format for interacting with that interface. The format can be a signature of an application programming interface (API) call, including the size, data type, and/or order of the parameters to be included in a call to the interface, and in some instances including a size and data type of a return value (if any) to be expected from the interface in response to the call. In some instances, the metadata 124 can specify a format, such as a REST format, to be used to call the management interface for an application 104. The metadata 124 can be employed by the management module(s) 116 to perform the calls to the various interface(s) 106 to propagate user roles from the database 112 to the individual applications 104 for one or more users 120, where the propagated user roles indicate the set of access rights to be used to control user access to the various applications 104.

A user 120 (e.g., an end-user) can employ a user device 118 to access one or more of the applications 106 in the platform environment 102, and the user's access to the application(s) 106 can be controlled based on the access rights information that has been propagated to each application 106 by the IAM tool.

FIG. 1B illustrates the way in which implementations can facilitate migration of user profiles between platform environments 102, through the IAM tool and its use of a unified user profile that specified user access rights for multiple applications. For example, a user profile 114 that is specified to control access to applications 104 executing in a first environment 102(1) can be moved, copied, or otherwise migrated to a second environment 102(2) that is separate and independent of the first environment 102(1). The access rights specified in the migrated user profile can be applied to the corresponding applications executing in the second environment 102(2), as in the first environment 102(1). In some implementations, each environment 102 may have a corresponding database 112 that is used to store user profiles 114 that control access rights in the corresponding environment 102. The migration of access rights between platform environments 102 can also employ the matrix 122 and/or metadata 124 as described above. Implementations provide a (e.g., virtual) agent-based service which can be on-demand. In some implementations, the IAM tool can provide suggestions for access rights management.

In some implementations, the IAM tool can operate through bootstrapping of the analytics stack and IAM. With respect to stack bootstrapping, software components can be (e.g., automatically) installed that provide for an IAM tool that is directory integrated. For example, installation of Talend™ can make the installed application directory integrated. The directory can be client specific and can reside (e.g., exclusively) within the client network. Through directory bootstrapping, implementations can create software-specific units within a directory. For example, Talend™ may have an OU within the directory, and Talend™ user groups may be within that OU. Accordingly, the database 112 may store a data in a directory structure, in which an OU (corresponding to an application) is a higher-level directory and the user groups (corresponding to access rights groups within the application) are lower-level directories (or files) within the OU directory. Through IAM bootstrapping, implementations can configure the IAM tool with all the components on the application stack. An application stack can include all the applications, or some of the applications, that are hosted in the platform 102.

In some implementations, the connectors for each stack component (e.g., vendor application) and the cloud system component (e.g., platform tools) can be configured. User management on each component level of the pipeline can be achieved on any suitable platform using the implementations described herein. For example, a particular client A may have the following analytics stack on an AWS™ cloud: Talend™, CDH™, Alteryx™, AWS™ Lambda, AWS™ Kinesis, and QlikView™. In this example, four types of user groups can be defined for different access rights to the different stack components: Group 1, which enables CDH™-related management; Group 2, which enables dashboard access on QlikView™; Group 3, which enables analytics on Alteryx™; and Group 4, which enables access to AWS™ tools. Following this example, IAM would have five OUs for Talend™, CDH™, Alteryx™, AWS™, and Qlik™, and five platform-related connectors.

In some implementations, the IAM tool can support user management activities on the various individual applications, and manage licenses for the various applications. The IAM tool can also provide audit logs, user management for an entire application stack, and/or user management on the platform 102.

In some implementations, the IAM tool can perform a secure (e.g., LDAP) connection on a port of the database 112 (e.g., port 636) with the help of a proxy user who is configured to have domain administrative rights. With the help of IAM tool, an operator with access to the IAM tool can create a new user, delete a user, edit user details, activate and/or deactivate a user, and/or move a user from one user group to another user group. The operator can also add a group, add a user to any group, delete a user from any group, edit group details, and/or delete an existing group in the database 112. The operator can give access to a user for the various applications, where such access rights are propagated to the individual applications from the database 112 by designating that the user in one or more particular user groups.

In some implementations, the IAM tool includes a directory manager. The directory manager can employ (e.g., JNDI-based) connectors based on a particular protocol for accessing the database, such as an LDAP protocol. The directory manager can perform auto-discovery to discover units that are present in the database 112. The directory manager can also manage OUs, manage user groups, and/or manage individual users.

The IAM tool can also include one or more connectors. These can include cloud connectors that connect to the platform's user management systems and perform various operations. For example, if a user is to be provided with AWS™ Lambda access, the connector can create a user profile for the new user, create a policy (e.g., OU and/or user group(s)) for AWS™ Lambda, and apply that policy to the new user by placing the user into the appropriate user group(s). The connectors can include extract-transform-load (ETL) connectors that perform user management operations directly on the software applications, by interfacing with the interface(s) 106. For example, native scripts can connect with a Talend™ Server and perform user management operations with respect to Talend™. The connectors can include data lake connectors that perform user management activities on a data lake component of the stack. For example, such a connector can connect to a Cloudera Manager™ and perform user management activities with respect to a Cloudera™-managed data lake. The connectors can also include analytics connectors that perform user management activities on analytics components of the stack, business intelligence (BI) connectors that perform user management activities on BI components of the stack, and so forth. In this way, implementations provide an IAM tool that is a holistic user management tool that can be suitable for any analytics stack on any platform.

In some implementations, the IAM tool can include an IAM interface that enables the management of user profiles, user groups, and/or OUs. The IAM interface can be a user interface (UI). The IAM interface can also expose an API to enable interactions with other processes executing locally or remotely from the IAM tool. In some implementations, the IAM interface includes a chat interface (e.g., a chatbot) that is configured to perform actions in response to operator input. For example, the chatbot (e.g., IAMBot) can use at least one suitable framework to perform natural language processing (NLP) on input text provided by the operator. Using the NLP-based interpretation, the chatbot can call the appropriate backend (e.g., REST) services to perform the requested actions. In one example, the operator can request that the chatbot "add user Jane Smith as Tableau admin." The chatbot can then call a REST API (e.g., of the API layer described herein) to add Jane Smith to the Tableau™ admin user group in the database 112 (e.g., by adding that user group to the user profile of the user). The chatbot can also trigger the action to synchronize the Tableau™ application in the platform with the database 112, and propagate the newly specified user role for the user to the application.

In some implementations, the IAM tool can support various types of operations, including but not limited to: Add User, to add single or multiple users; Edit User Details, to change details for existing users; Delete User, to remove single or multiple users; Move User, to move one or more users from one group to another group; and/or Activate/Deactivate User, to activate or deactivate a user. Activating or deactivating a user can control whether the user is able to access the applications to which they have been granted access rights.

In some implementations, the IAM tool supports an architecture that includes a UI layer, an API layer, a business layer, and a database layer. The UI layer is accessible by the operators. Through this layer, the operators can interact with the IAM tool to perform different operations. When the operator interacts with the IAM tool to perform some operation, a backend API can be called to retrieve any data requested by the operator and/or perform any operation on the database 112. Each operation can be related to an API which is called when the operator performs that operation through the UI layer. The business layer can include the logic of the IAM tool. This layer can include the various controller classes and/or service implementations which interact with the database 112 when a operator performs a specific operation. The database layer include the database 112 (e.g., Active Directory) which is used by the IAM tool. When an operator performs an operation (e.g., create, update, delete, move, activate/deactivate users, etc.) related to the database 112, the appropriate operation(s) can be performed at the database layer and the results can be passed to the business layer, and consequently through the API and UI layers to be presented to the operator through the IAM interface.

Implementations can employ any suitable technology stack for the IAM tool. In some examples, the IAM tool can execute on device(s) 108 that execute a version of Linux™, Windows™, or other suitable operating system. In some examples, the IAM tool can be written using a version of Java™, or other suitable programming languages. The database 112 can be a version of Active Directory, as supported by Microsoft Exchange Server™, or other suitable (e.g., LDAP-supporting) solution. Network connectivity between the IAM tool and other components (e.g., the database 112) can be provided by a version of Apache Tomcat™ or other suitable server. Data that is communicated and/or stored as described herein can be compressed and/or encrypted using any suitable compression and/or encryption technique(s).

Figure 2:
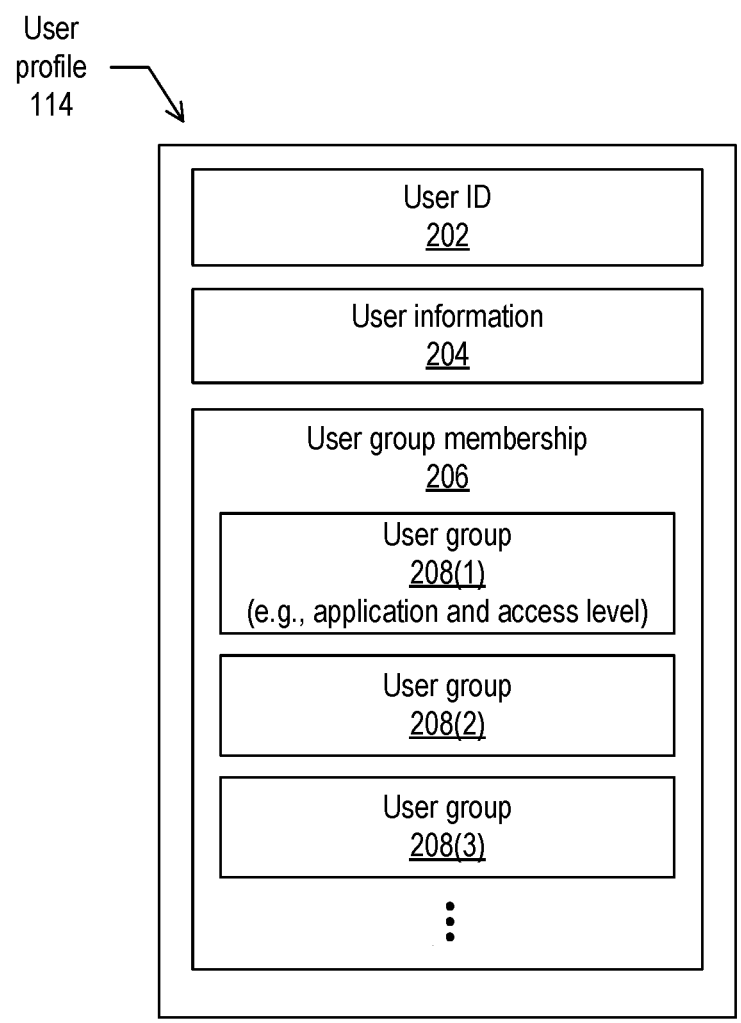
FIG. 2 depicts an example user profile, according to implementations of the present disclosure.

FIG. 2 depicts an example user profile 114, according to implementations of the present disclosure. As shown in this example, a user profile 114 can include a user ID 202, such as a unique ID for a particular user 120, and other user information 204 describing the user 120, such as user contact information (e.g., email address, phone number, etc.). The user profile 114 for a user 120 can also include user group information 206 that describes one or more user groups 208 in which the user 120 has been designated as a member. As described above, each user group 208 can be associated with a particular application 104 and a particular set of access rights on that application 104. User groups can be defined as being in a directory under an OU that corresponds to the application, as described above. The user profile 114 can be stored in a comma-separated values (CSV) format, or in some other suitable format.

Figure 3:
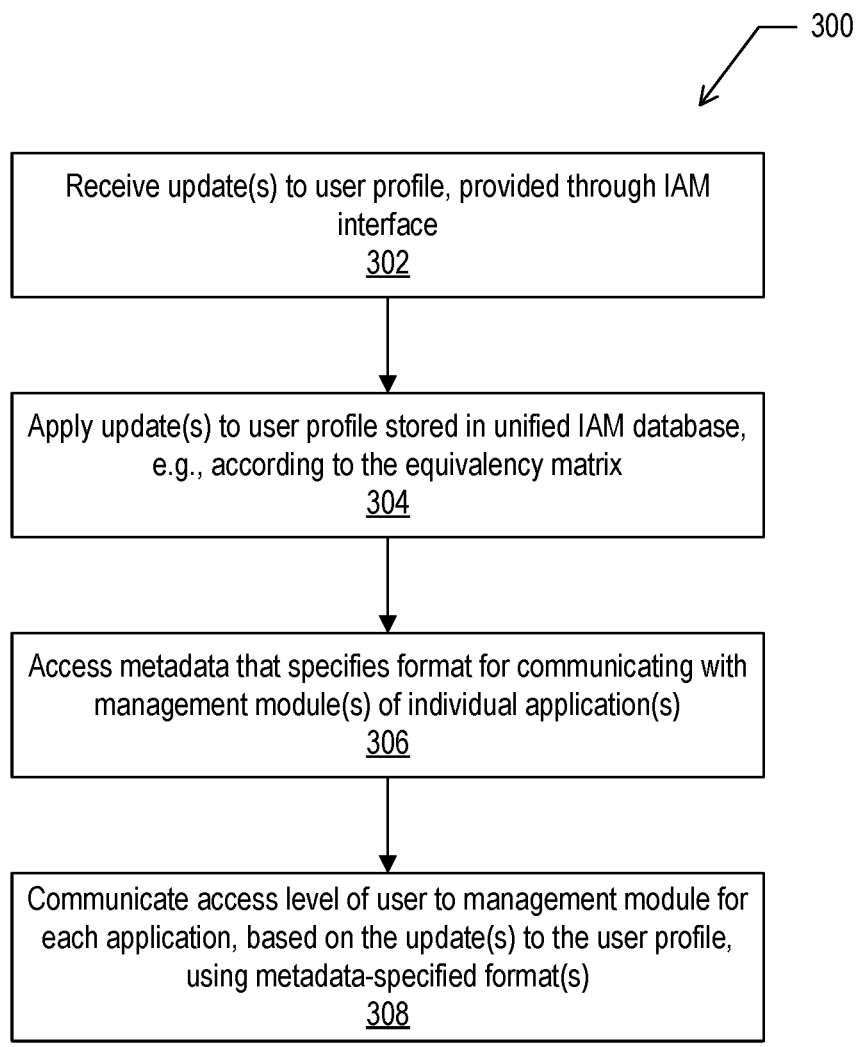
FIG. 3 depicts a flow diagram of an example process for identity and access management, according to implementations of the present disclosure.

FIG. 3 depicts a flow diagram of an example process for identity and access management, according to implementations of the present disclosure. Operations of the process can be performed by one or more components of the IAM tool. One or more updates can be received (302) to a user profile 114. The updates can be provided through the IAM interface of the IAM tool, by an operator in some instances. An update can include an operation to add a user, delete a user, edit user details, add or remove the user from user groups, activate or deactivate a user, move a user between user groups, and so forth.

The update(s) can be applied (304) to the user profile 114 for the user 120, the user profile 114 stored in the database 112. In some instances, the matrix 122 can be employed to map user roles between applications and/or between a general user role and individual application user roles as described above. For example, based on the operator's designation of a particular user into an overall (e.g., non-application-specific) administrator role, the matrix 122 can be accessed to determine the role that is the equivalent of the overall administrator role in one or more applications, such as an admin role in Application A, a superuser role in Application B, and so forth. Accordingly, the specification of an overall role for a user can be translated into application-specific roles, which can then be specified in the user profile 114 of the user 120. In some implementations, the specification of a general role and/or application-specific role for the user, can be used by the IAM tool to recommend the appropriate role for the user 120 in other applications 104. For example, if the operator designates the user 120 as an admin in Application A, the IAM tool can recommend (e.g., through the IAM interface), that the user 120 be designated as a superuser in Application B, based on the matrix-specified equivalence between those two roles in Application A and Application B.

In some implementations, the metadata 124 can be accessed (306), which specifies the format for communicating with the native management interface(s) 106 of the various application(s) 104 as described above. The metadata-specified format information can then be used to communicate with the native management interface(s).

The updates to the user profile 114 can be propagated to the various applications in the platform, by communicating (308) the access level for the user to each management module 106 for each application 104 impacted by the update(s), as described above, using the metadata-specified formats.

Figure 4:
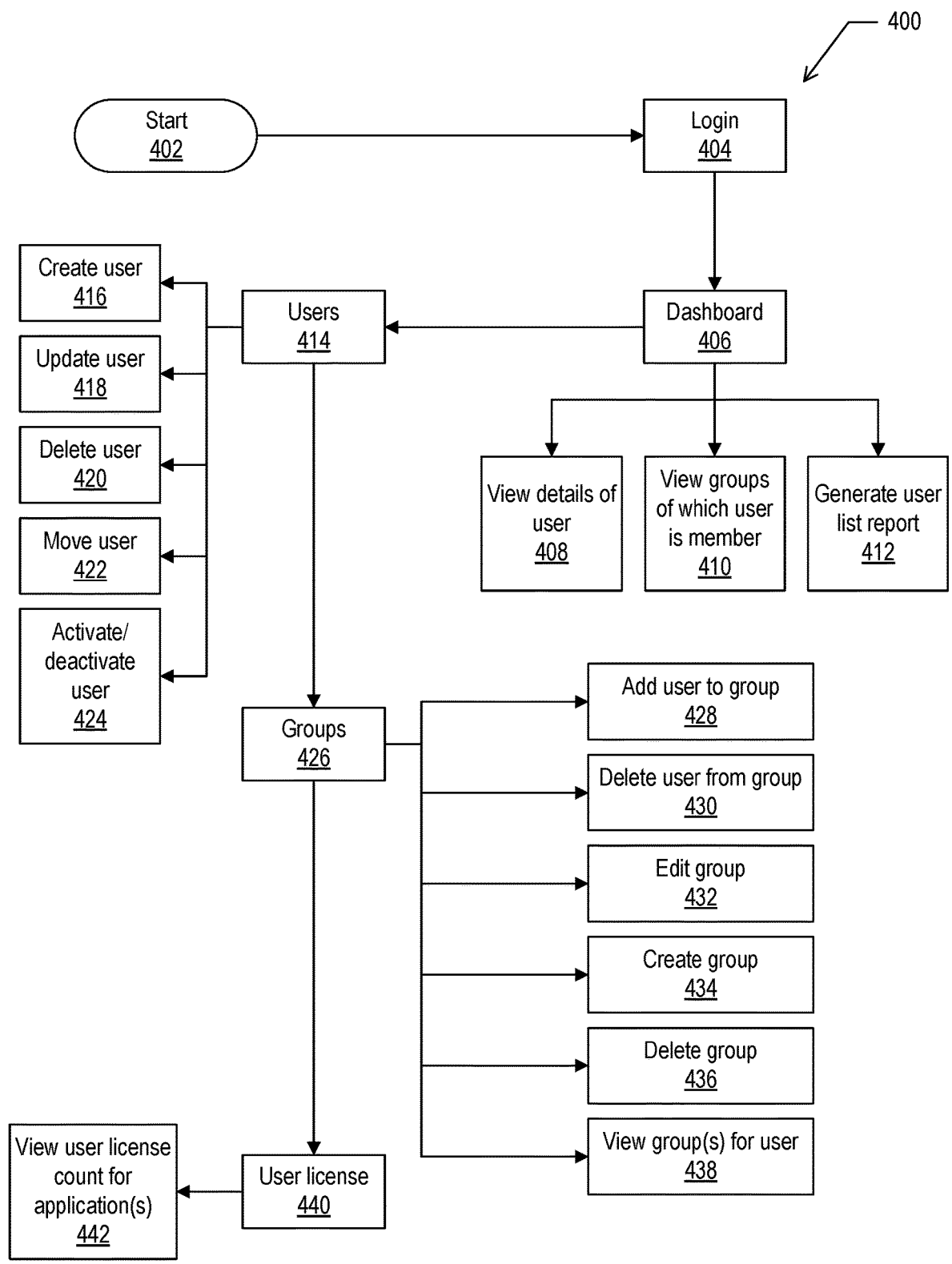
FIG. 4 depicts a flow diagram of an example workflow provided by an identity and access management system, according to implementations of the present disclosure.

FIG. 4 depicts a flow diagram of an example workflow provided by the IAM interface described herein, according to implementations of the present disclosure. After the start 402 of the workflow, the operator can navigate to a login page 404 of the IAM interface. The operator can enter their credentials (e.g., user ID and password) to login to the IAM tool. After logging in, the operator can land in the Dashboard Page 406 of the IAM interface. The operator can perform various operations in the Dashboard Page: the operator can search by any username in a search bar to view the details 408 of any user present in the database 112; the operator can click on a Group icon to view the groups 410 in which a user is a member; and/or the operator can request a User List Report which causes the tool to generate a report of all the user details present in the database 112. Such a report can be generated as a CSV-formatted file, or in some other suitable format.

On navigating to the Users page 414 of the IAM interface, the operator can perform various operations: the operator can create (add) 416 one or more new users in the database 112; the operator can update 418 one or more users by editing the details of existing users in the database 112; the operator can delete 420 one or more users from the database 112; the operator can move 422 one or more users in the database 212 from one user group to another; and/or the operator can activate or deactivate 424 one or more users in the database 112.

On navigating to the Groups page 426 of the IAM interface, the operator can perform various operations: the operator can view 438 the Groups List in which a user is a member; the operator can add 428 one or more users to a group in the database 112; the operator can delete 430 one or more users from a group; the operator can create 434 a new group under an OU in the database 112; the operator can delete 436 a group in the database 112; and/or the operator can edit 432 a group by updating the details of an existing group database 112.

On navigating to a User License page 440 of the IAM interface, the operator can perform one or more operations that include viewing 442 the license details for one or more applications 104, such as viewing the number of licenses being used (and/or available licenses currently unused) for a particular application. For example, the number of licensed being used for an application can be the total number of users that are in one or more user groups under the OU for the application. On the User License page, the operator can access license expiration data information, license count information, and/or other license information for each application. The operator can also access trust certificate information, including certificate expiration information for application(s).

The IAM interface can also allow an operator to: view, add, delete, and/or update OUs; view, add, delete, and/or update user groups under each of the OUs; and/or view a list of users currently designated as members of each user group. The various operations described above, requested through the IAM interface, can trigger operations to be performed at the API level as described above, to request that the logic layer access and/or update information stored in the database 112.

Figure 5:
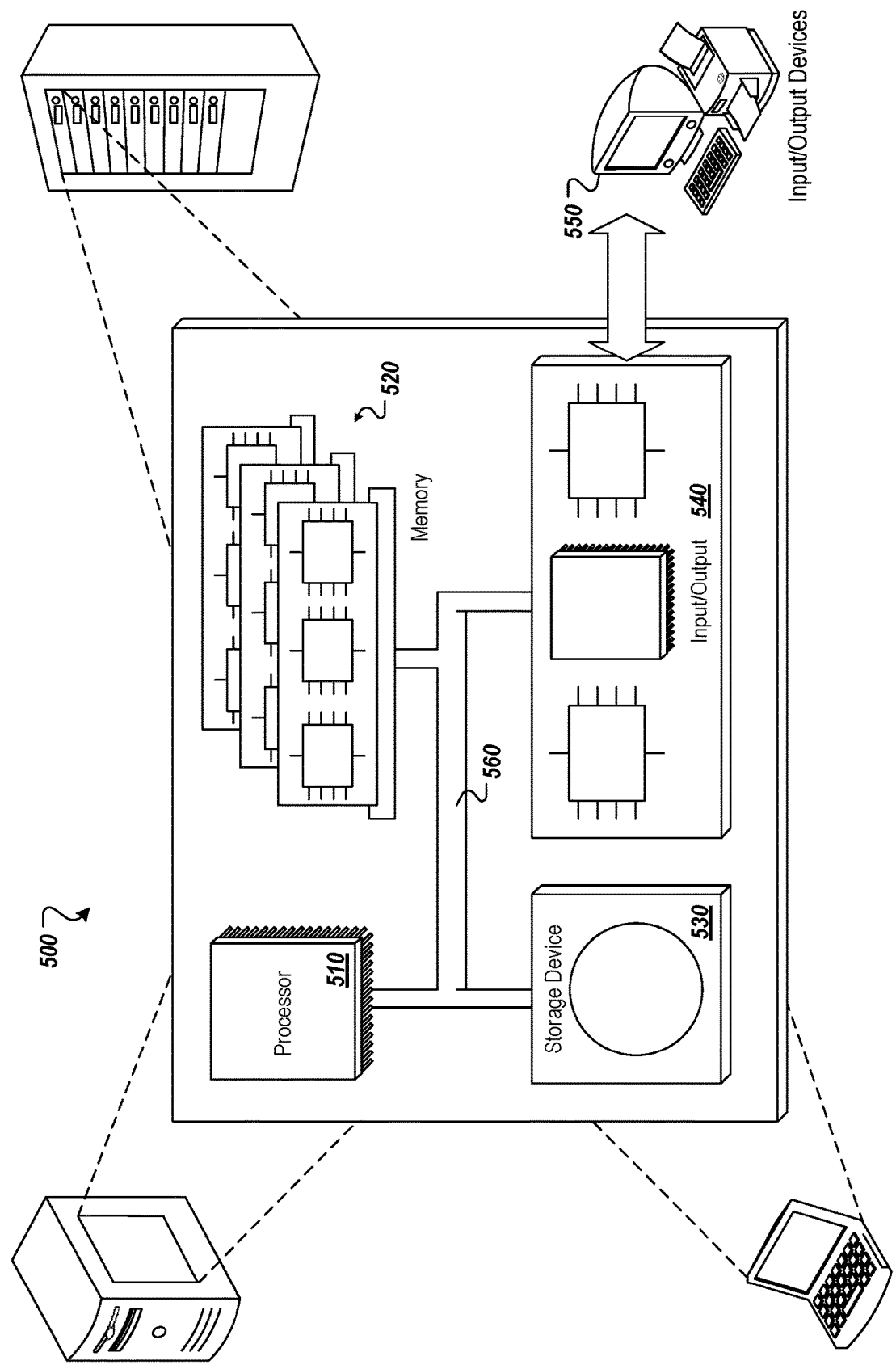
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the management computing device(s) 108, computing device(s) that host the platform environment 102, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by an identity and access management (IAM) system that includes at least one processor, the method comprising:

receiving, by the IAM system that includes the at least one processor, at least one update to a user profile of a user, the at least one update provided through an IAM interface executing on a computing device, wherein the IAM interface is a single interface that is useable to configure user profiles to control user access to a plurality of applications that execute in a platform;

applying, by the IAM that includes the at least one processor, the at least one update to the user profile that is stored in a unified IAM database, wherein the user profile indicates a respective access level of the user to each of at least two applications of the plurality of applications;

accessing, by the IAM system that includes the at least one processor and for each of the at least two applications, metadata that is predetermined data that describes a communication format for communicating with a respective management module for the respective application, wherein the metadata is separate from the user profile; and based on the user profile, communicating, by the IAM system that includes the at least one processor and for each of the at least two applications and using the respective metadata, the respective access level of the user to the respective management module through a call to an interface of the respective management module that is made using the communication format described in the metadata, wherein the respective access level of the user controls access of the user, using any of multiple computing devices including the computing device, to the respective application.

2. The method of claim 1, further comprising:
accessing, by the at least one processor, a matrix that specifies at least one mapping between corresponding access levels on different applications, wherein the applying of the at least one update to the user profile is based at least partly on the at least one mapping specified by the matrix.

3. The method of claim 2, wherein:
the at least one update includes a designation of an overall role for the user;
the matrix specifies a mapping between the overall role and a corresponding access level on the at least two applications; and
the applying of the at least one update to the user profile includes designating the corresponding access level for the user on the at least two applications.

4. The method of claim 1, wherein the user profile indicates that the user is a member of at least two user groups, each of the user groups corresponding to an application and an access level for the application.

5. The method of claim 4, wherein the at least one update to the user profile includes one or more of:
adding the user to create the user profile as a new user profile;
adding a user group to the user profile; and
removing a user group from the user profile.

6. The method of claim 4, further comprising:
displaying, by the at least one processor, through the IAM interface, for each of the user groups, a number of users who are members of the respective user group.

7. The method of claim 1, further comprising:
displaying, by the at least one processor, through the IAM interface, the user profile of the user including the respective access level of the user to each of the at least two applications.

8. The method of claim 1, wherein the access level includes one or more of a viewing access level and an administrative access level.

9. A system comprising:
at least one processor; and
a memory communicatively coupled to the at least one processor, the memory storing instructions which, when executed, cause the at least one processor to perform operations comprising:
receiving at least one update to a user profile of a user, the at least one update provided through an identity and access management (IAM) interface executing on a computing device, wherein the IAM interface is a single interface that is useable to configure user profiles to control user access to a plurality of applications that execute in a platform;
applying the at least one update to the user profile that is stored in a unified IAM database, wherein the user profile indicates a respective access level of the user to each of at least two applications of the plurality of applications;
accessing, for each of the at least two applications, metadata that is predetermined data that describes a communication format for communicating with a respective management module for the respective application, wherein the metadata is separate from the user profile; and
based on the user profile, communicating, for each of the at least two applications and using the respective metadata, the respective access level of the user to the respective management module through a call to an interface of the respective management module that is made using the communication format described in the metadata, wherein the respective access level of the user controls access of the user, using any of multiple computing devices including the computing device, to the respective application.

10. The system of claim 9, the operations further comprising:
accessing a matrix that specifies at least one mapping between corresponding access levels on different applications, wherein the applying of the at least one update to the user profile is based at least partly on the at least one mapping specified by the matrix.

11. The system of claim 10, wherein:
the at least one update includes a designation of an overall role for the user;
the matrix specifies a mapping between the overall role and a corresponding access level on the at least two applications; and
the applying of the at least one update to the user profile includes designating the corresponding access level for the user on the at least two applications.

12. The system of claim 9, wherein the user profile indicates that the user is a member of at least two user groups, each of the user groups corresponding to an application and an access level for the application.

13. The system of claim 12, wherein the at least one update to the user profile includes one or more of:
adding the user to create the user profile as a new user profile;
adding a user group to the user profile; and
removing a user group from the user profile.

14. The system of claim 12, the operations further comprising:
displaying, through the IAM interface, for each of the user groups, a number of users who are members of the respective user group.

15. The system of claim 9, the operations further comprising:
displaying, through the IAM interface, the user profile of the user including the respective access level of the user to each of the at least two applications.

16. The system of claim 9, wherein the access level includes one or more of a viewing access level and an administrative access level.

17. One or more non-transitory computer-readable storage media storing instructions which, when executed, cause at least one processor to perform operations comprising:
receiving at least one update to a user profile of a user, the at least one update provided through an identity and access management (IAM) interface executing on a computing device, wherein the IAM interface is a single interface that is useable to configure user profiles to control user access to a plurality of applications that execute in a platform;
applying the at least one update to the user profile that is stored in a unified IAM database, wherein the user profile indicates a respective access level of the user to each of at least two applications of the plurality of applications;
accessing, for each of the at least two applications, metadata that is predetermined data that describes a communication format for communicating with a respective management module for the respective application, wherein the metadata is separate from the user profile; and based on the user profile, communicating, for each of the at least two applications and using the respective metadata, the respective access level of the user to the respective management module through a call to an interface of the respective management module that is made using the communication format described in the metadata, wherein the respective access level of the user controls access of the user, using any of multiple computing devices including the computing device, to the respective application.

18. The one or more computer-readable storage media of claim 17, the operations further comprising:

accessing a matrix that specifies at least one mapping between corresponding access levels on different applications, wherein the applying of the at least one update to the user profile is based at least partly on the at least one mapping specified by the matrix.

19. The one or more computer-readable storage media of claim 18, wherein:

the at least one update includes a designation of an overall role for the user;

the matrix specifies a mapping between the overall role and a corresponding access level on the at least two applications; and the applying of the at least one update to the user profile includes designating the corresponding access level for the user on the at least two applications.

20. The one or more computer-readable storage media of claim 17, wherein the user profile indicates that the user is a member of at least two user groups, each of the user groups corresponding to an application and an access level for the application.

* * * * *